(12) United States Patent
Turner (10) Patent No.: US 7,599,670 B2
(45) Date of Patent: Oct. 6, 2009

(54) DYNAMIC BIAS FOR RECEIVER CONTROLLED BY RADIO LINK QUALITY

(75) Inventor: James B. Turner, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

(21) Appl. No.: 11/186,085

(22) Filed: Jul. 21, 2005

(65) Prior Publication Data

US 2007/0021087 A1   Jan. 25, 2007

(51) Int. Cl.
   *H01Q 11/12* (2006.01)
(52) U.S. Cl. ............... 455/127.1; 455/127.3; 455/298; 455/311; 455/341; 455/67.11; 330/253; 330/277; 330/285; 330/296; 330/270
(58) Field of Classification Search ........... 455/501, 455/63.1, 67.11, 67.13, 114.2, 114.3, 115.1, 455/234.1, 249.1, 250.1, 311, 67.15, 254, 455/232.1, 234.2, 226.1–226.3, 237.1, 245.1, 455/296; 330/253, 277, 285, 296, 259, 261, 330/267, 270, 273, 290, 96, 127, 137, 199
See application file for complete search history.

(56) References Cited

U.S. PATENT DOCUMENTS

| 5,507,023 | A | * | 4/1996 | Suganuma et al. ........ 455/234.1 |
| 5,703,529 | A | * | 12/1997 | Ghaffaripour et al. ......... 330/51 |
| 5,789,983 | A | * | 8/1998 | Fujita ........................ 330/277 |
| 5,907,798 | A | * | 5/1999 | Abramsky et al. ........ 455/249.1 |
| 5,930,696 | A | * | 7/1999 | Tzuang et al. ............... 455/311 |
| 6,134,430 | A | * | 10/2000 | Younis et al. ................ 455/340 |
| 6,175,279 | B1 | * | 1/2001 | Ciccarelli et al. ........... 330/296 |
| 6,226,504 | B1 | * | 5/2001 | Takagi ..................... 455/234.1 |
| 6,388,526 | B1 | * | 5/2002 | Daniel et al. ................ 330/285 |
| 6,735,424 | B1 | * | 5/2004 | Larson et al. ............ 455/250.1 |
| 7,053,712 | B2 | * | 5/2006 | Bonaccio et al. ............ 330/258 |
| 7,071,779 | B2 | * | 7/2006 | Shi et al. ..................... 330/253 |
| 2001/0036816 | A1 | * | 11/2001 | Wieck ........................ 455/130 |
| 2003/0181179 | A1 | * | 9/2003 | Darabi ..................... 455/234.1 |
| 2003/0184382 | A1 | * | 10/2003 | Tsutsui et al. ............... 330/285 |
| 2007/0052482 | A1 | * | 3/2007 | Kasha et al. ................ 330/302 |

* cited by examiner

*Primary Examiner*—Edward Urban
*Assistant Examiner*—Junpeng Chen
(74) *Attorney, Agent, or Firm*—Merchant & Gould, P.C.

(57) ABSTRACT

DC power savings in a mobile communication device can be achieved by dynamically adjusting the biasing for a receiver based on the communication link quality. The output signal levels of at least one low noise amplifier (LNA) are monitored to identify the DC operating conditions for the LNA. Closed loop control of the DC biasing is adjusted based on a comparison between the monitored DC operating conditions and a reference signal. The output of the LNA is also coupled to a radio receiver section that is configured (e.g., SW or HW) to evaluate the link quality based on various criteria such as inter-modulation distortion, noise, interference, fading, etc. The reference signal that is used to control the DC biasing of the LNA is adjusted (periodically, continuously, or on demand) in response to the evaluated link quality. The dynamic biasing yields acceptable signal reception with low DC power consumption.

18 Claims, 10 Drawing Sheets

DYNAMIC BIAS FOR RECEIVER CONTROLLED BY RADIO LINK QUALITY

FIELD OF THE INVENTION

The present disclosure generally relates to communication technology. More particularly, the present disclosure relates to a method and apparatus that monitors the quality of a communication link for dynamic adjustment of a bias signal that is used by a communications receiver.

BACKGROUND

Analog or digital information may be communicated to a remote receiver using a variety of communication theory techniques. A typical transmission system includes a transmitter, a communication channel, and a receiver. The transmitter converts the analog or digital information into a form that is suitable for transmission over the communication channel. The receiver recreates the original information from the transmitted signal. The communication channel may be any transmission medium such as wire, optical fiber, or merely free space in which the signals are transmitted as an electromagnetic wave (e.g., radio and television signals).

In a typical wireless communication system, a data signal that includes the information is modulated with a carrier signal and transmitted into free space with an antenna. The receiving system has an antenna and receiver that are tuned to the carrier frequency. The receiving system demodulates the received signal and extracts the data signal. The antenna that is used in the receiving system is usually closely tuned to the carrier frequency.

Technological improvements have made it possible to provide sophisticated functions in portable devices. These portable devices often include wireless communication receivers, transmitters, as well as other functionality such as might be found in personal information managers (PIMS), cellular telephones, personal data assistants (PDAs), palmtop computers, laptop computers, to name a few. Although many of these modern devices include a wireless communication subsystem, the performance of those communication subsystems can be hampered by the physical constraints of the device. For example, limited battery life, poor antenna performance, and in-efficient use of power can yield a weak communication link that results in poor user satisfaction.

SUMMARY OF THE INVENTION

The present disclosure relates to an electronic circuit arrangement that monitors the quality associated with communication link such as an RF communication signal. DC power savings in the portable electronic device can be achieved by dynamically adjusting the biasing for a receiver based on the link quality. The output signal levels of at least one low noise amplifier (LNA) are monitored to identify the DC operating conditions for the LNA. Closed loop control of the DC biasing is adjusted based on a comparison between the monitored DC operating conditions and a reference signal. The output of the LNA is also coupled to a radio receiver section that is configured (e.g., SW or HW) to evaluate the link quality based on various criteria such as inter-modulation distortion, noise, interference, fading, etc. The reference signal that is used to control the DC biasing of the LNA is adjusted (periodically, continuously, or on demand) in response to the evaluated link quality. The dynamic biasing yields acceptable signal reception with low DC power consumption.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

Non-limiting and non-exhaustive embodiments are described with reference to the following drawings.

DETAILED DESCRIPTION

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a", "an", and "the" may include reference to both the singular and the plural. The meaning of "in" may include "in" and "on". The term "connected" may mean a direct electrical, electromagnetic, mechanical, logical, or other connection between the items connected, without any electrical, mechanical, logical or other intermediary therebetween. The term "coupled" can mean a direct connection between items, an indirect connection through one or more intermediaries, or communication between items in a manner that may not constitute a connection. The term "circuit" can mean a single component or a plurality of components, active and/or passive, discrete or integrated, that are coupled together to provide a desired function. The term "signal" can mean at least one current, voltage, charge, data, or other such identifiable quantity.

Briefly stated, the present disclosure generally relates to portable or mobile electronic devices such as wireless personal data assistants (PDAs), personal information managers (PIMs), cellular telephones, smart phones, digital cameras, wireless palmtop computers, wireless watch devices, and other wireless communication devices. DC power savings in a mobile communication device can be achieved by dynamically adjusting the biasing for a receiver based on the communication link quality. The output signal levels of at least one low noise amplifier (LNA) are monitored to identify the DC operating conditions for the LNA. Closed loop control of the DC biasing is adjusted based on a comparison between the monitored DC operating conditions and a reference signal. The output of the LNA is also coupled to a radio receiver section that is configured (e.g., SW or HW) to evaluate the link quality based on various criteria such as inter-modulation distortion, noise, interference, fading, etc. The reference signal that is used to control the DC biasing of the LNA is adjusted (periodically, continuously, or on demand) in response to the evaluated link quality. The dynamic biasing yields an acceptable signal reception quality with low DC power consumption.

As described herein, the portable electronic device may be a smart watch type device that is specially configured to receive and/or transmit communication signals. Although certain embodiments are described in the context of a smart watch-based system, it will be apparent that the teachings of the application have equal applicability to other mobile devices, such as portable computers, personal digital assistants (PDAs), cellular telephones, alarm clocks, key-chains, refrigerator magnets, and the like. The use of a watch is for illustrative purposes only to simplify the following discussion, and may be used interchangeably with "mobile device", and/or "client device".

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

Operating Environment

Figure 1:
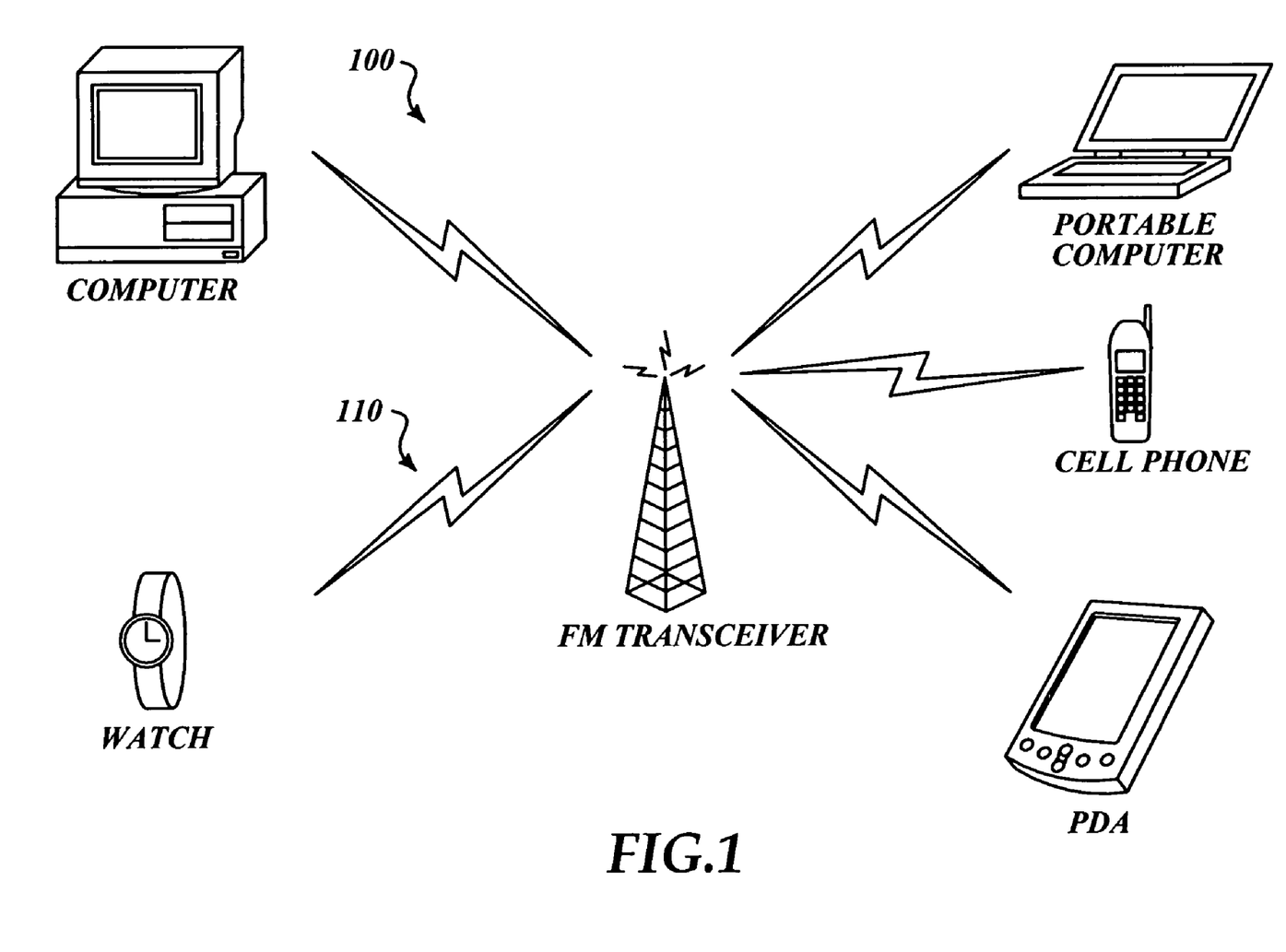
FIG. 1 is a diagram illustrating an example operating environment.

FIG. 1 illustrates an example operating environment (100) for the present disclosure. As illustrated in the figure, an FM transceiver or broadcast is transmitted over a communication channel (110) to various electronic devices. Example electronic devices that have an FM receiver or transceiver may include a desktop computer, a watch, a portable computer, a wireless cellular telephone (cell phone), and/or a personal data assistant (PDA), to name a few. The electronic devices are arranged to receive information from the FM broadcast. The FM broadcast may be of any number of types including but not limited to: a standard FM transmission, a sub-carrier FM transmission, or any other type of FM transmission as may be desired.

The operating environment shown and described are only examples of suitable operating environments and are not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Illustrative Electronic System

Figure 2:
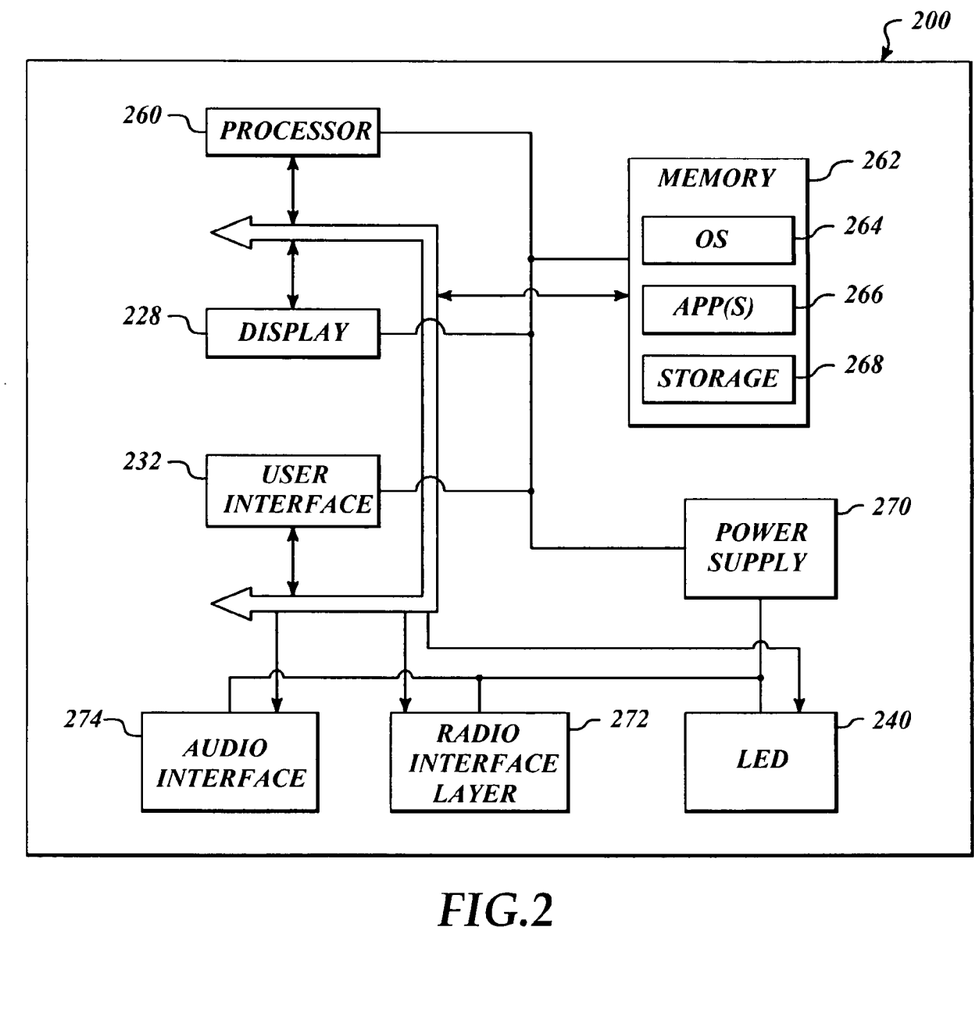
FIG. 2 is a schematic diagram illustrating an example electronic device.

FIG. 2 is a schematic diagram illustrating functional components of an illustrative electronic device 200. The electronic device (200) has a processor (260), a memory (262), a display (228), and a user interface (232). The memory 262 generally includes both volatile memory (e.g., RAM) and non-volatile memory (e.g., ROM, Flash Memory, battery backed up RAM, and the like). The electronic device (200) includes an operating system (264), such as the Windows CE operating system from Microsoft Corporation or another operating system, which is resident in the memory (262) and executes on the processor (260). The user interface (232) may be a series of push buttons, a scroll wheel, a numeric dialing pad (such as on a typical telephone), or another type of user interface means. The display (228) may be a passive type liquid crystal display, an active type liquid crystal display, a monochromatic display, a multiple bit display, a full color display, or any other type of display as may be desirable in a portable electronic device. In one example, the display (228) is a touch-sensitive screen that may also be used as an input device. The touch screen may be any type, included but not limited to: a resistive type touch screen, a capacitive type touch screen, and an inductive type touch screen.

One or more application programs (266) are loaded into memory 262 and run on operating system 264. Example application programs include phone dialer programs, email programs, scheduling/calendaring programs, PIM (personal information management) programs, contact manager programs, Internet browser programs, and others. The electronic device (200) also includes a storage (268) that is either located within the memory (262) or in a separate memory (e.g., compact flash, secure digital, NAND flash, etc.). The storage (268) may be used to store information in a non-volatile or persistent manner such that the information is preserved when the electronic device (200) is powered down. The application (266) may use and store information in the storage (268), such as e-mail or other messages used by an e-mail application, contact information used by a PIM, appointment information used by a scheduling program, documents used by a word processing application, and the like.

The electronic device (200) has a power supply (270), which may be implemented as one or more batteries. The power supply (270) might further be arranged to utilize an external power source, such as an AC adapter or a powered docking cradle that supplements or recharges the batteries.

The electronic device (200) is also shown with two types of external notification mechanisms: an LED (240) and an audio interface (274). These devices may be directly coupled to the power supply (270) so that when activated, they remain on for a duration dictated by the notification mechanism even though the processor (260) and other components might shut down or suspend their operation to conserve battery power. The LED (240) may be programmed to remain on indefinitely until the user initiates a power down sequence. The audio interface (274) may be used to provide audible signals to and receive audible signals from the user. For example, the audio interface (274) may be coupled to a speaker for providing audible output and to a microphone for receiving audible input, such as to facilitate a telephone conversation, or as a user interface for voice recognition. In another example, a vibration device (not shown) can be used to provide tactile feedback to the user such as for alerting the user of a newly arrived message. The electronic device (200) can control each alert mechanism separately (e.g., audio, vibration, as well as visual cues).

The electronic device (200) also includes a radio interface layer (272) that performs the function of receiving and/or transmitting radio frequency communications. The radio interface layer (272) facilitates wireless connectivity between the electronic device (200) and the outside world, via a communications carrier or service provider. Transmissions to and from the radio interface layer (272) may be conducted under control of the operating system (264). In other words, communications received by the radio interface layer (272) may be disseminated to application programs (266) via the operating system (264), and vice versa.

Example Electronic Device

Figure 3:
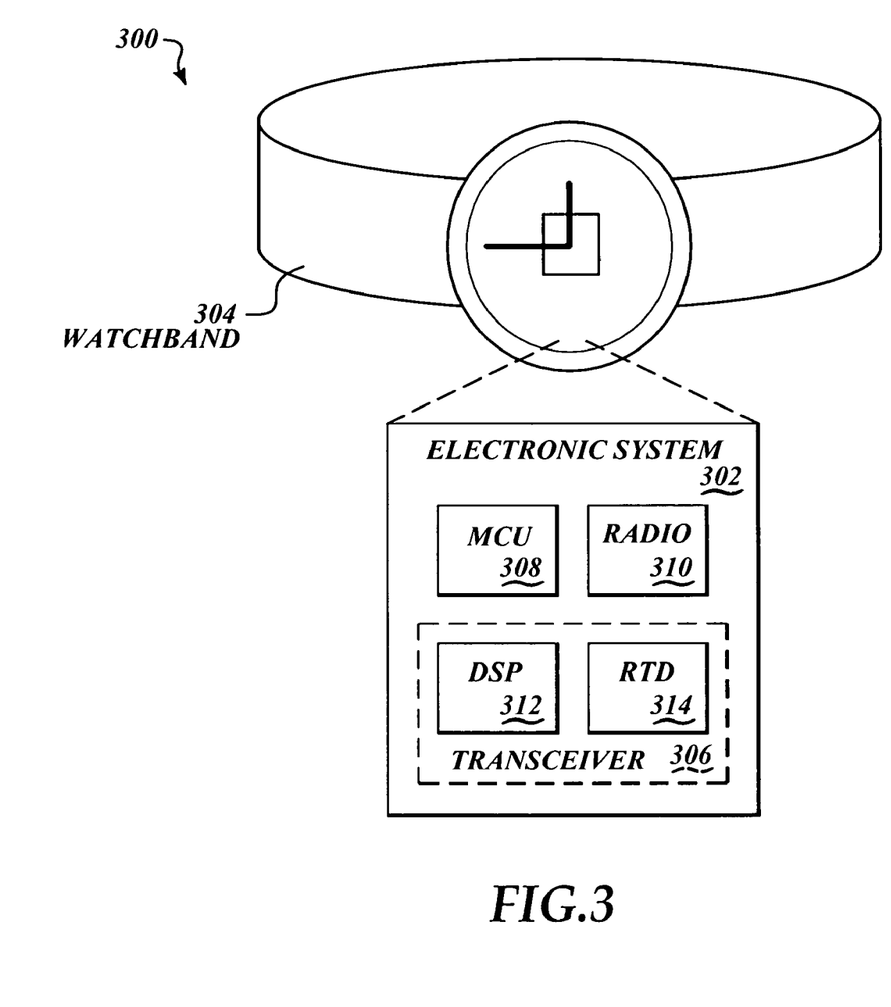
FIG. 3 depicts a watch device that includes an example electronic system.

An exemplary watch device 300 is shown in FIG. 3. The watch device (300) includes an electronic system (302) that is configured to operate in accordance with at least one aspect of the present disclosure. The electronic system (302) may be contained in the bezel as shown in FIG. 3, or in some other portion of the watch device. The watch device (300) also may include a watchband (304) for attaching the watch to a user's wrist.

The electronic system (302) includes functionality for operating as either a receiver and/or transceiver type of device. As illustrated in the figure, the electronic system includes a transceiver (306), a microcomputer unit or microprocessor (308), and an analog radio (310). As will be described in detail below, an antenna is connected to the transceiver (306) for emitting and/or receiving information signals. Transactions between the microprocessor (308) and the radio components are mediated over a microprocessor-digital transceiver interface. The components of the watch device (300) are housed in a watch-sized enclosure and rely on battery power for operation.

The transceiver (306) generally includes a digital signal processor (DSP) (312), which performs control, scheduling, and post-processing tasks for the transceiver, and a real-time device (RTD, 314), which includes a digital radio, system timing, and real-time event dispatching. The DSP (312) is coupled to the microprocessor (308), and transceiver tasks are commanded by the microprocessor (308).

One of the DSP's tasks may process received data for such purposes as sub-carrier phase recovery, baud recovery and/or tracking, compensation for fading effects, demodulation, de-interleaving, channel state estimation and/or error-correction. The post-processing of packets may occur when an entire packet has been received, or another subsequent time. The DSP (312) analyzes the transmitted data packets to determine a broadcast station's signal timing with respect to the local clock of the RTD (314). The local clock is synchronized with the transmitter's clock signal to maintain signal sampling integrity. The receiver is periodically brought into symbol synchronization with the transmitter to minimize misreading of the received data.

The digital section of the RTD (314) may include system time-base generators, such as a crystal oscillator that provides the system clock for the microprocessor (308) and the DSP (312). The time-base also provides baud and sample timing for transmit and receive operations, start/stop control for radio operation, and controls the periods of clock suspension to the microprocessor (308) and the DSP (312). The RTD (314) also performs radio operations, and may perform additional operations as well. The radio (310) is arranged to receive segments of data that is arranged in packets.

Example Receiver System

Figure 4:
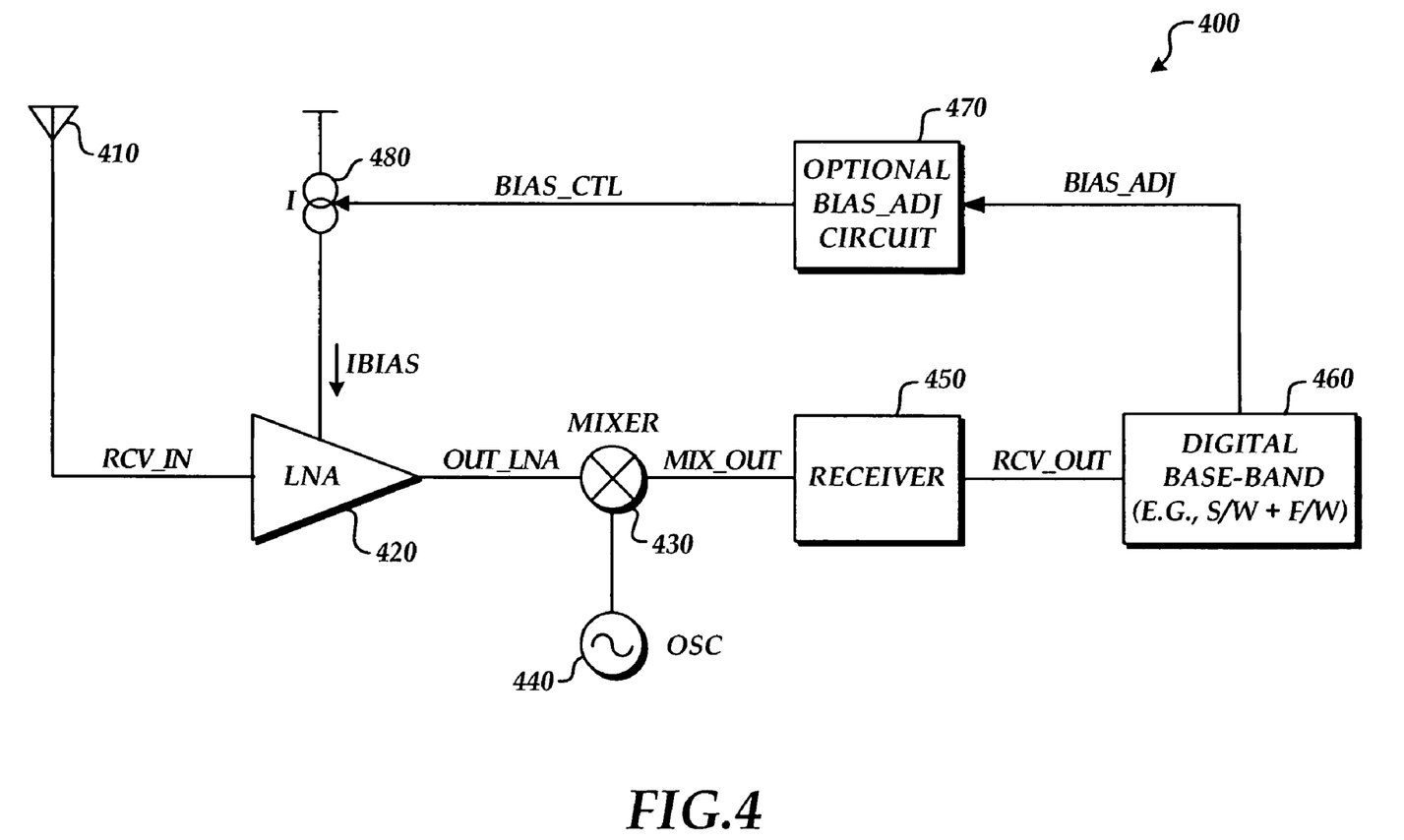
FIG. 4 is a schematic diagram illustrating an example receiver system.

FIG. 4 is a schematic diagram illustrating an example receiver system (400). The receiver system (400) includes an antenna circuit (410), a low-noise amplifier (420), a mixer circuit (430), an oscillator (440), a receiver (450), a digital base band system (460), an optional bias adjustment circuit (470), and a biasing circuit (480).

The antenna circuit (410) is in electrical communication with the low noise amplifier (420). The low noise amplifier (420) is arranged to provide an output signal (e.g., OUT_LNA) to the mixer (430), responsive to signals (e.g., RCV_IN) received from the antenna circuit (410). The oscillator (440) is arranged to provide an oscillation signal (OSC) to the mixer (430). The output (e.g., MIX_OUT) of the mixer (430) is coupled to the receiver (450) for processing. The receiver (450) is arranged to provide a base-band signal (e.g., RCV_OUT) that is subsequently processed by the digital base-band circuit (460). The digital base-band circuit (460) is arranged to evaluate the quality associated with the received information and provide a bias adjustment signal (e.g., BIAS_ADJ) in response thereto. The optional bias adjustment circuit (470) is arranged to provide a bias control signal (BIAS_CTL) in response to the bias adjustment signal (BIAS_ADJ), which is used by the biasing circuit (e.g., 480) to adjust biasing for the low noise amplifier (e.g., adjusting a bias voltage or a biasing current).

The present disclosure contemplates various difficulties that may exist in mobile communication devices. DC power savings, noise immunity, and signal interference immunity, are important factors that influence connection quality in mobile communication devices. The receiver in an RF system often has to overcome various noise and interferences before clear reception is possible. Noise and interference may come from a variety of environmental factors that are external to the RF system (e.g., electromagnetic interference (EMI), microwave transmitters, etc.) or other electronic noise sources that are internal to the RF system itself (e.g., Johnson noise, Shot noise, etc.). Average white Gaussian noise (AWGN) as well as other narrow tone interferers can plague the reception quality.

The present disclosure recognizes that there are advantages in knowing the receiver's communication link (e.g., RF link) quality and various characteristics associated with potential signal interference. Knowledge of such parameters allows the DC current in the receiver circuits (e.g., LNA 420) to be dynamically adjusted such that average power consumption can be minimized for maximum battery life. Known interferences may be present at one or more specific frequencies or in a known band of frequencies. Knowledge of such interferences frequencies can be used in one or more calculations (e.g., by the DSP of FIG. 2) to determine an optimal biasing condition for the amplifiers. The quality of the communication link (e.g., the RF communication link) is monitored and the DC power consumption of the various circuits can be limited even in the presence of strong or weak interference. The coordinated effort of hardware components (e.g., biasing of the amplifiers, calculations by DSP processors, etc.) and software methodologies (e.g., algorithms in the DSP, microprocessor, and any other processing means) allow the radio to have good reception (e.g., strong RF signal strength) and low DC power consumption in the presence of both strong and weak interferences.

Partial Receiver System

Figure 5:
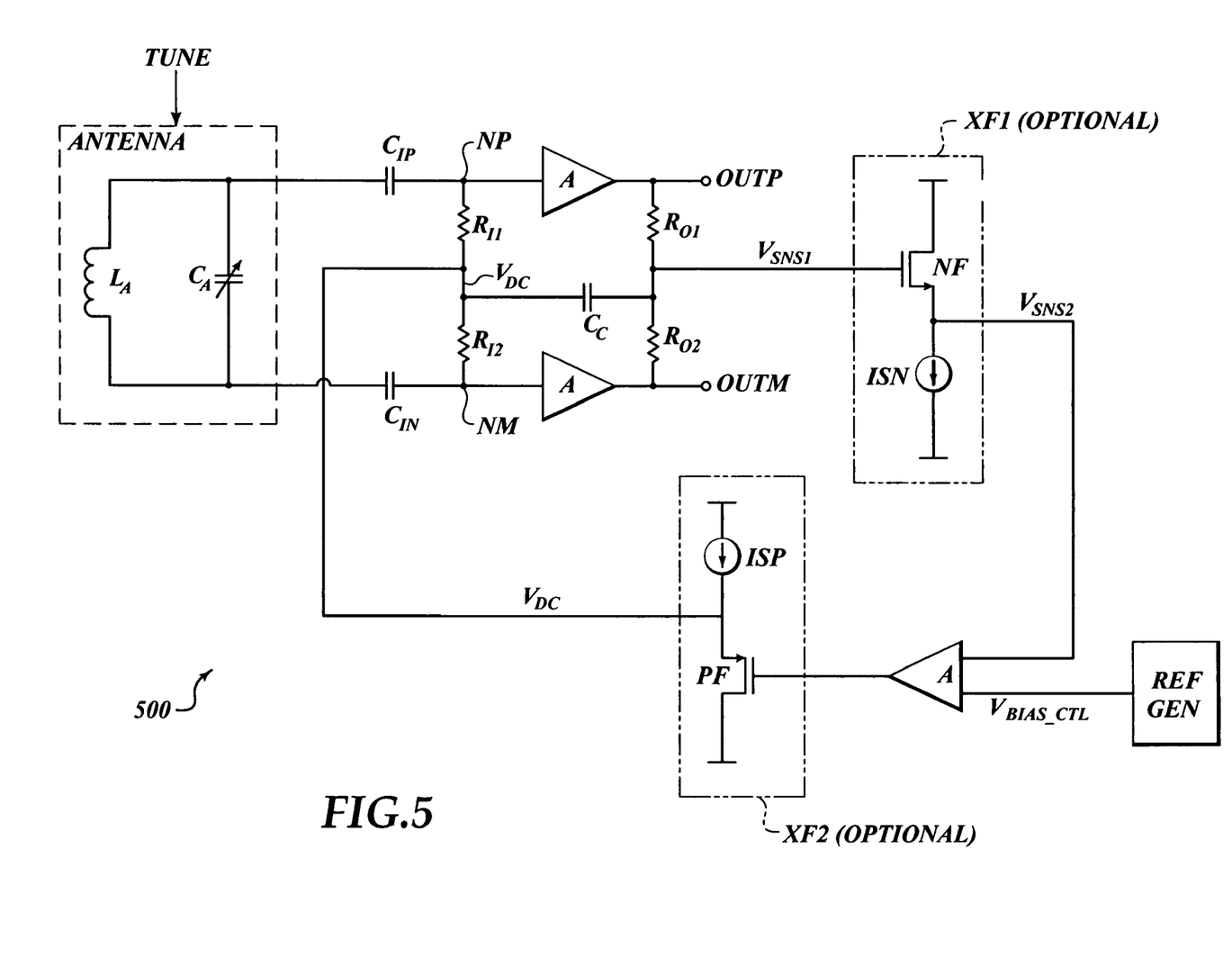
FIG. 5 is a schematic diagram illustrating a portion of another example receiver system.

FIG. 5 is a schematic diagram illustrating a portion of another example receiver system (500). Receiver system 500 includes an antenna circuit, three capacitor circuits (CIP, CIN and CC), four resistor circuits (RI1, RI2, RO1 and RO2), two low noise amplifier circuits, two optional follower circuits (XF1 and XF2), a differential amplifier circuit, and a reference generator circuit.

The tuned antenna circuit is illustrated as an inductor LA that is coupled in parallel with a variable capacitor (CA) to form a resonant circuit. The variable capacitor can have a nominal capacitance value that is adjusted in response to an antenna adjustment signal (TUNE) for tuning of the antenna to a desired frequency range for reception. A first side of the tuned circuit is coupled to a first input (INP) of a first of the low noise amplifier circuits through capacitor circuit CIP. A second side of the tuned circuit is coupled to a second input (INM) of a second of the low noise amplifier circuits through capacitor circuit CIN. The first low noise amplifier circuit is arranged to provide a first output signal (OUTP) in response to the first input signal (INP), while the second low noise amplifier circuit is arranged to provide a second output signal (OUTM) in response to the second input signal (INM).

Resistor circuits RI1 and RI2 are coupled in series between INP and INM, where the common point is biased by a DC biasing signal (VDC). Resistor circuits RO1 and R02 are series coupled between OUTP and OUTM; where the common point is arranged to provide a sense signal (VSNS1) that is related to the DC signal level of the output of the low noise amplifiers. CC is coupled between the common points to provide compensation of the low noise amplifiers.

VSNS1 is coupled to the differential amplifier as VSNS2 via optional follower circuit XF1 (e.g., an n-type transistor biased as a follower by current source ISN). An output of the reference generator circuit (VBIAS_CTL) is coupled to one input of the differential amplifier circuit. VSNS2 (or VSNS1 when no follower is employed) is coupled to the other input of the differential amplifier circuit. The differential amplifier is arranged to provide a control signal in response to a comparison between VSNS2 and VBIAS_CTL such that signal VDC is adjusted to a desired DC bias set point for the low noise amplifiers. The DC bias can be offset and/or buffered by optional follower circuit XF2 (e.g., a p-type transistor biased as a follower by current source ISP).

The output of the reference generator circuit (VBIAS_CTL) can be used to set a biasing current (IBIAS) in the low noise amplifiers as illustrated in FIG. 4, to set a biasing voltage (VDC) as illustrated in FIG. 5, and/or to bias other circuits as may be necessary to adjust for power consumption. The reference generator circuit receives an adjustment control signal (e.g., BIAS_ADJ or BIAS_CTL) as illustrated in FIG. 4.

The receiver system of FIG. 4 includes a LNA that may utilize a high percentage of the total power budget (e.g., 70%-80% of the current from the battery). The DC power of the receiver can be substantially controlled and minimized by adjusting the operating current of the LNA such that battery life is extended. For one example implementation such as illustrated by FIG. 5, the LNA is split into two low noise amplifier paths that each consume a high average current (e.g., 9.6 mA DC). Thus, the two halves of the LNA consume twice the high operating current (e.g., 19.2 mA DC), while the remaining receiver circuitry may only consume a nominal current (e.g., 5 mA DC). By dynamically adjusting the bias levels of each half of the LNA in a predetermined operating range (e.g., between 4 mA and 10 mA), significant improvements in battery life can be realized.

The DC bias of the LNA (see e.g., FIGS. 4-5) is maintained by a DC control loop that monitors the DC portion of the output of the LNA (e.g., voltage VSNS1). The monitoring can be accomplished by constant voltage monitoring as is shown in FIG. 5, or by sampling the voltage at some periodic rate. A closed loop analog control method drives the required DC voltage (e.g., VDC) to the input of the amplifiers. The reference generator can then be selectively controlled by a separate control mechanism that is determined based on the quality of the communication link. For example, receiver 450 and digital base-band 460 monitor various reception and signal qualities to control the reference generator. The voltage that is provided by the reference generator is thus controlled to provide a change to the LNA output DC voltage (and so the bias), which is isolated from the signal path.

Example Low Noise Amplifier (LNA)

Figure 6:
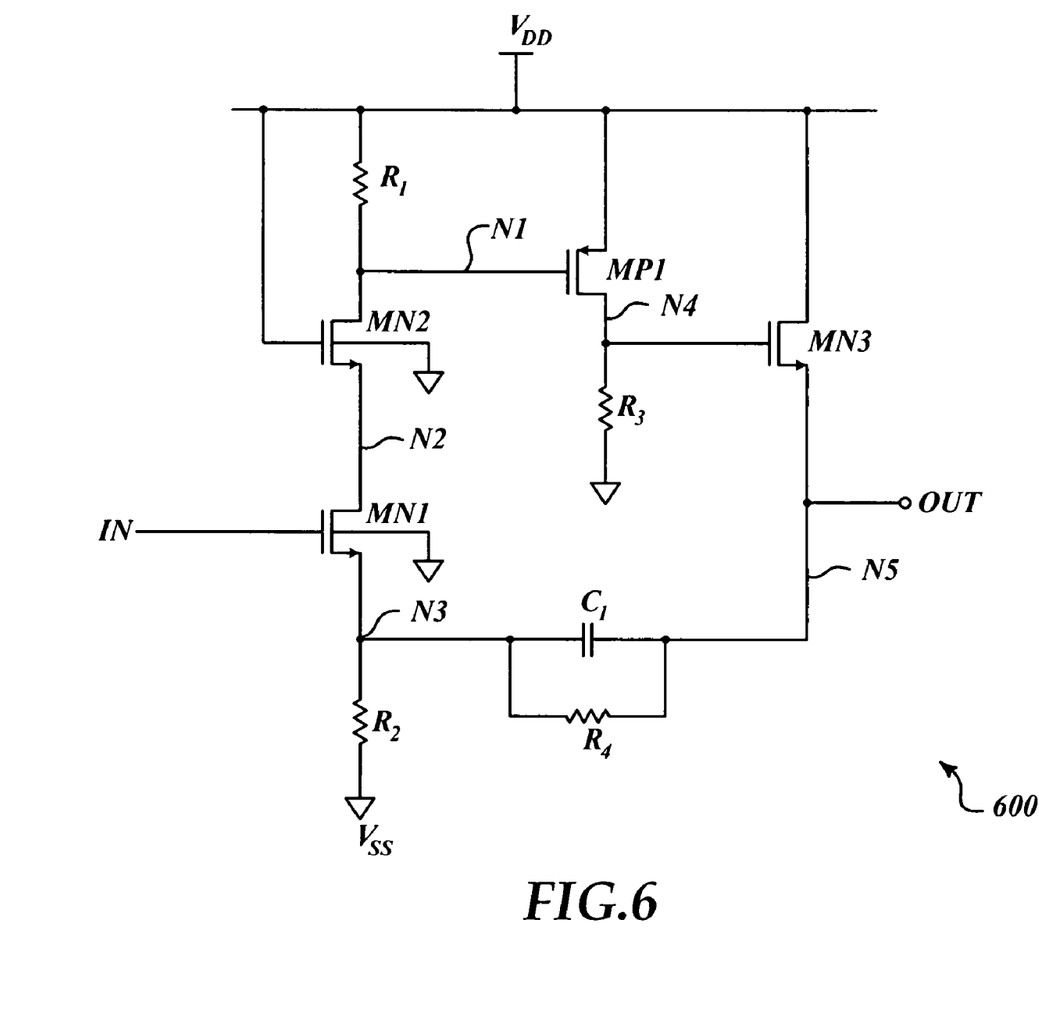
FIG. 6 is a schematic diagram illustrating an example amplifier.

FIG. 6 is a schematic diagram illustrating an example amplifier (600). Amplifier 600 includes four transistors (MN1-MN3 and MP1), four resistors (R1-R4), and a capacitor (C1).

Transistor MN1 includes a drain coupled to node N2, a source coupled to node N3, a gate that is arranged to receive an input signal (IN), and a substrate or bulk that is coupled to a low power supply (e.g., VSS, GND, etc.). Transistor MN2 includes a drain coupled to node N1, a source coupled to node N2, a gate that is coupled to a high power supply (e.g., VDD, VCC, etc.), and a substrate or bulk that is coupled to the low power supply. Transistor MN3 includes a drain coupled to the high power supply, a source coupled to node N5, a gate that is coupled to node N4, and a substrate or bulk that is coupled to the low power supply (not shown.). Transistor MP1 includes a drain coupled to node N4, a source coupled to the high power supply, a gate that is coupled to node N1, and a substrate or bulk that is coupled to the high power supply (not shown). Resistor R1 is coupled between the high power supply and node N1. Resistor R2 is coupled between node N3 and the low power supply. Resistor R4 is coupled between node N4 and the low power supply. Resistor R4 and capacitor C1 are coupled together in parallel with one another, and series coupled between node N3 and node N5. Node N5 is arranged as an output of amplifier 600.

Signal IN includes both AC and DC portions. Transistor MN1 is biased by the DC portion of signal IN, and responsive to the AC portion of signal IN. Transistor MN2 is arranged as a cascode transistor that is biased by the high supply, but can alternatively be biased by another bias control signal. Resistor R1 cooperates with transistors MN1 and MN2 to provide a first inverting gain stage to node N1 with respect to signal IN. Transistor Mp1 and resistor R3 are arranged as a second inverting gain stage between nodes N1 and N4. Transistor MN3 is arranged as a follower stage in the amplifier that provides buffering functions. Capacitor C1 represents a load capacitance on node N5, while resistor R2 represents a resistance between the low power supply and node N3 (e.g., trace resistance in a circuit board or in an integrated circuit in the power routing).

The DC portion of signal IN determines the biasing of transistor MN1 in FIG. 6, as previously stated. The DC voltage drop across resistor R1 sets up a biasing point for transistor MP1, which is also determined by the operating current in transistor MN1 also flows (neglecting any lost currents into the substrate). Similarly, the DC voltage drop across resistor R3 sets up a biasing point for transistor MN3, which is determined by the operating current in transistor MP1. The DC portion of signal IN thus affects the overall operating current for amplifier 600.

The amplifier has a gain that is fixed by feedback so that changing the bias current has only a slight affect on overall gain. The relatively constant gain in the amplifier maintains a substantially consistent signal levels as the input signals progress through the system. Noise figure (or input referred noise) is not significantly affected by the change in biasing conditions with relatively constant gain.

Example Reference Generators

Figure 7:
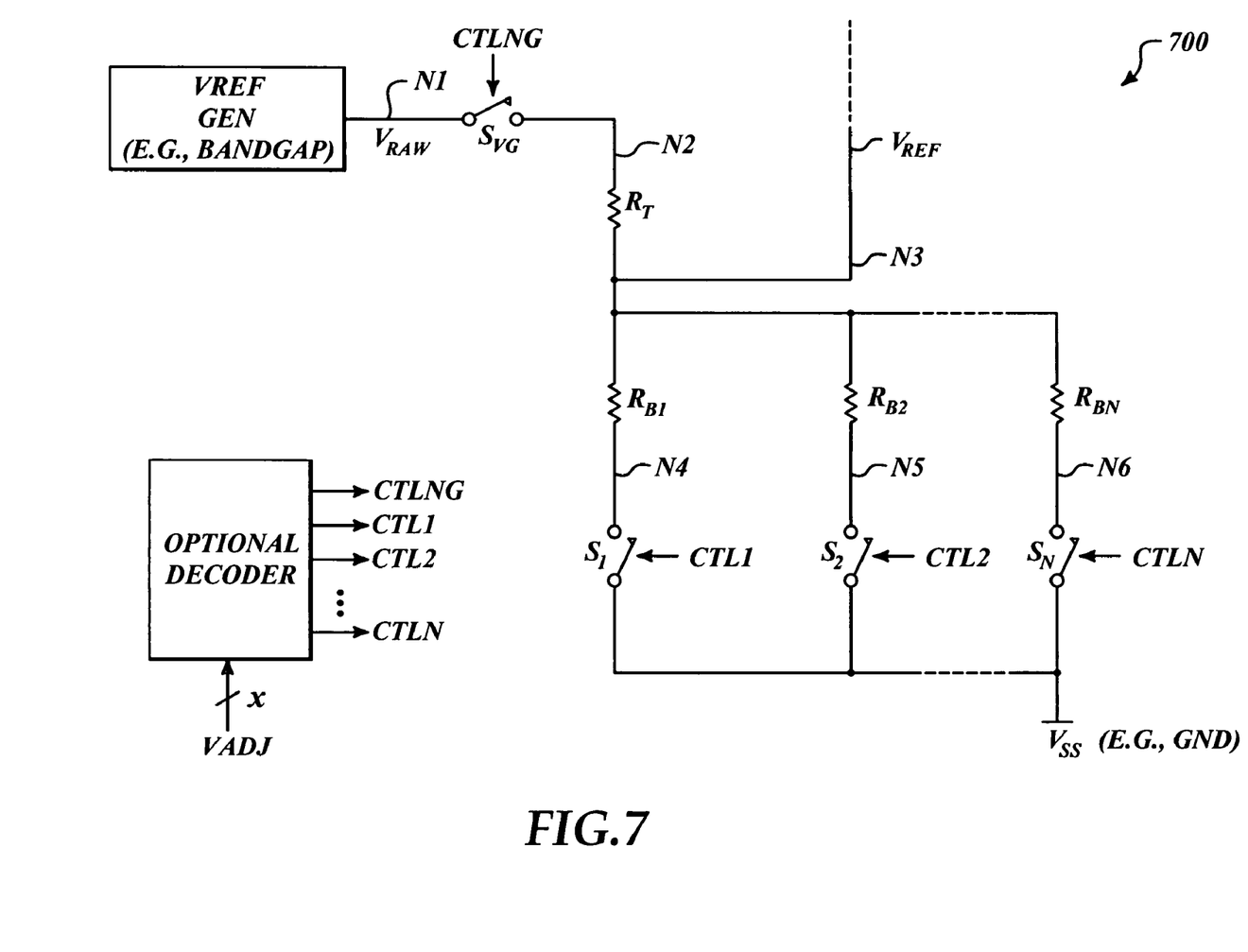
FIG. 7 is a schematic diagram illustrating an example reference generator.
Figure 8:
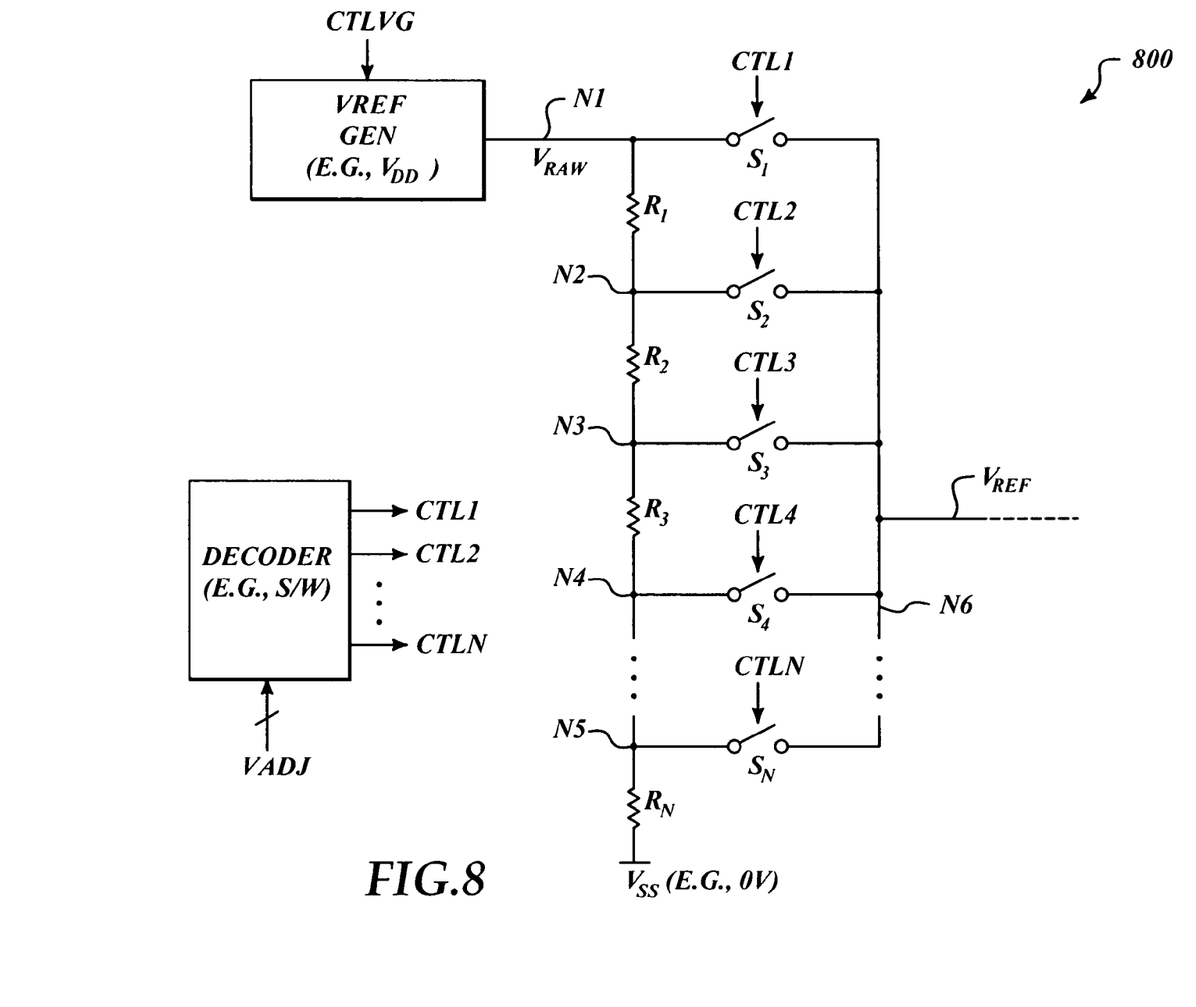
FIG. 8 is a schematic diagram illustrating another example reference generator.

FIGS. 7 and 8 are schematic diagrams illustrating example reference generator circuits.

The reference generator circuit (700) depicted in FIG. 7 includes: a voltage generator (e.g., a band-gap voltage generator), switching circuits SVG and S1-SN, resistor circuits RT and RB1-RBN, and an optional decoder circuit. The voltage reference generator is arranged to provide a voltage (e.g., VRAW) to node N1. Switching circuit SVG is arranged to selectively couple node N1 to node N2 in response to control signal CTLVG. Resistor circuit RT is coupled between node N2 and node N3. Resistor circuit RB1 is coupled between node N3 and node N4. Resistor circuit RB2 is coupled between node N3 and node N5. Resistor circuit RBN is coupled between node N3 and node N6. Switching circuit S1 is arranged to selectively couple node N4 to a power supply voltage (e.g., VDD, VSS, GND, etc.) in response to signal CTL1. Switching circuit S2 is arranged to selectively couple node N5 to the power supply voltage in response to signal CTL2. Switching circuit SN is arranged to selectively couple node N6 to the power supply voltage in response to signal CTLN.

The optional decoder circuit provides the various control signals in response to an adjustment control signal (e.g., VADJ). The decoder can be implemented as a hardware component, a software component, or a combination of hardware and software. A voltage divider is formed between resistor circuit RT and one of the remaining circuits when switching circuit SVG and another switching circuit are closed. For example, closing switch S1 forms a voltage divider with resistor RB1, while closing switch S2 forms a voltage divider with resistor RB2. The reference voltage (VREF) corresponds to the voltage at node N3, and is determined by VRAW and the selected resistor divider ratio.

The resistance values associated with resistor circuits RB1-RBN can be scaled relative to one another according to a linear relationship, a non-linear relationship, a logarithmic relationship, a binary relationship, or some other relationship. The number of discretely selectable resistances determines the range of adjustments to VREF. The scaling factor for VREF is determined by the discrete values of the resistor divider ratios.

The reference generator circuit (800) depicted in FIG. 8 includes: a voltage generator (e.g., a band-gap voltage generator, VDD, VSS, etc.), switching circuits S1-SN, resistor circuits R1-RN, and an optional decoder circuit. The voltage reference generator is arranged to provide a voltage (e.g., VRAW) to node Ni. Resistor circuit R1 is coupled between node N1 and node N2. Resistor circuit R2 is coupled between node N2 and node N3. Resistor circuit R3 is coupled between node N3 and node N4. Resistor circuit RN is coupled between node N5 and a power supply (e.g., VDD, VSS, GND, etc). Switching circuit S1 is arranged to selectively couple node N1 to node N6 in response to signal CTL1. Switching circuit S2 is arranged to selectively couple node N2 to node N6 in response to signal CTL2. Switching circuit S3 is arranged to selectively couple node N3 to node N6 in response to signal CTL3. Switching circuit S4 is arranged to selectively couple node N4 to node N6 in response to signal CTL4. Switching circuit SN is arranged to selectively couple node N5 to node N6 in response to signal CTLN.

The optional decoder circuit again provides the various control signals in response to an adjustment control signal (e.g., VADJ). The decoder can be implemented as a hardware component, a software component, or a combination of hardware and software. A voltage divider is formed between resistors R1-RN by closing one of the switching circuits. A tap point in the resistor divider is selected and a reference voltage (VREF) is provided at node N6. The relative values of the resistances for resistor circuits R1-RN determine the voltage divider ratio, and thus the output voltage of the reference.

Although series and parallel-configured resistive voltage dividers are depicted in FIGS. 7 and 8, other combinations of parallel and series circuits are contemplated. In one example, a combined series and parallel resistive circuit may be used. In another example, the resistor circuits are designed with biased transistors configured to operate as resistors. In still another example, divider circuits are designed using capacitive dividers.

Example Procedure Flow

Figure 9:
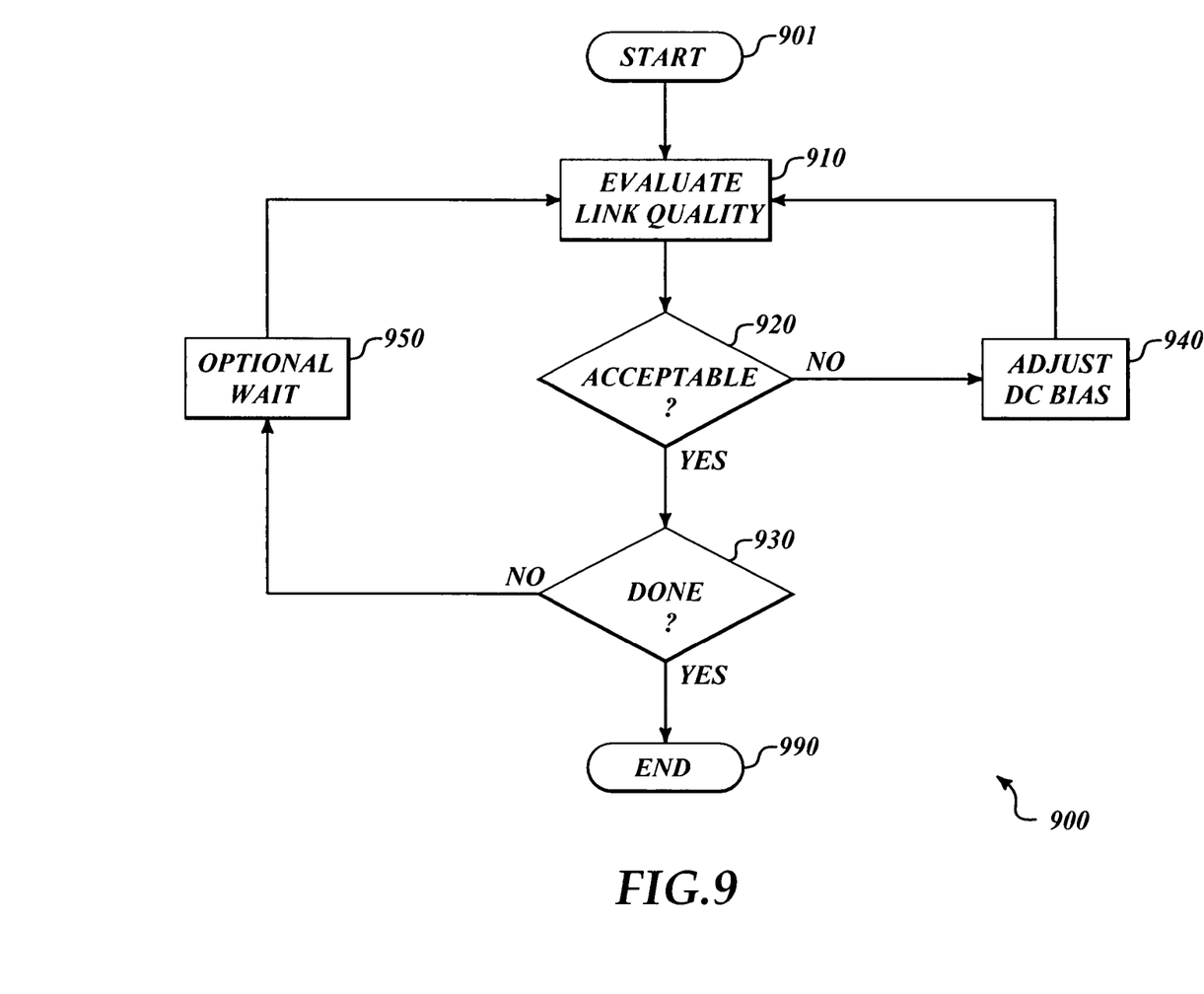
FIG. 9 illustrates an example procedural flow diagram for an electronic system.

FIG. 9 illustrates an example procedural flow diagram for an electronic system arranged in accordance with at least one feature of the present disclosure. Processing begins at block 901 and proceeds to block 910.

At block 910, the link quality is evaluated such as by way of algorithmic processing via a processor, a microprocessor, a digital signal processor (DSP), or a hardware component that is designed to provide similar functionality. Example criteria that may be evaluated at block 910 includes: distortion, intermodulation distortion, harmonic distortion, interference, noise, signal-to-noise, spurious noise, Gaussian noise, colored noise, white noise, and power consumption, to name a few.

Processing continues to decision block 920, where a determination of the acceptability of the communication link quality is made. Processing flows to decision block 930 when the link quality is acceptable. Alternatively, processing flows to block 940 when the link quality is not acceptable.

At decision block 930, the link quality is acceptable and a determination is made as to whether or not additional link quality monitoring is necessary. When no more link quality monitoring is necessary, processing flows to block 990 where processing is concluded. Alternatively, processing continues to optional block 950, where processing is temporarily suspended until a wait time has expired (or some other event triggers the start of another link quality process. After the wait period is terminated, processing flows to block 910.

The DC bias for the receiver section (e.g., the LNA) is adjusted at block 940 to attempt to improve the communication link quality. In one example, the DC bias is increased as the result of excessive signal interferences. In another example, the DC bias is decreased until the power consumption is reduced within an acceptable range for a desired signal quality level. Processing flows from block 940 to block 910.

Inter-modulation Distortion

The biasing current required by the LNA (see e.g., FIGS. 4-6) is constrained mainly by the need to reduce third order inter-modulation effects. Interference signals that occur at a frequency that may cause a problem is not present in the environment at a signal level that would necessarily be observed in the radio reception.

Third (3rd) order inter-modulation distortion of certain interference frequencies is affected by the bias change to the LNA. The software mechanism in the radio (e.g., DSP, algorithmic, or otherwise) monitors the communication link quality to assess distortion and interference effects. A reduced bias can cause the transistors in the amplifier (e.g., see discussion for FIG. 6) to change their DC operating point. The new operating point can cause reduced RF sensitivity in the presence of interference. The apparent "rejection" of interference may be improved at higher DC bias levels in the amplifier.

Figure 10:
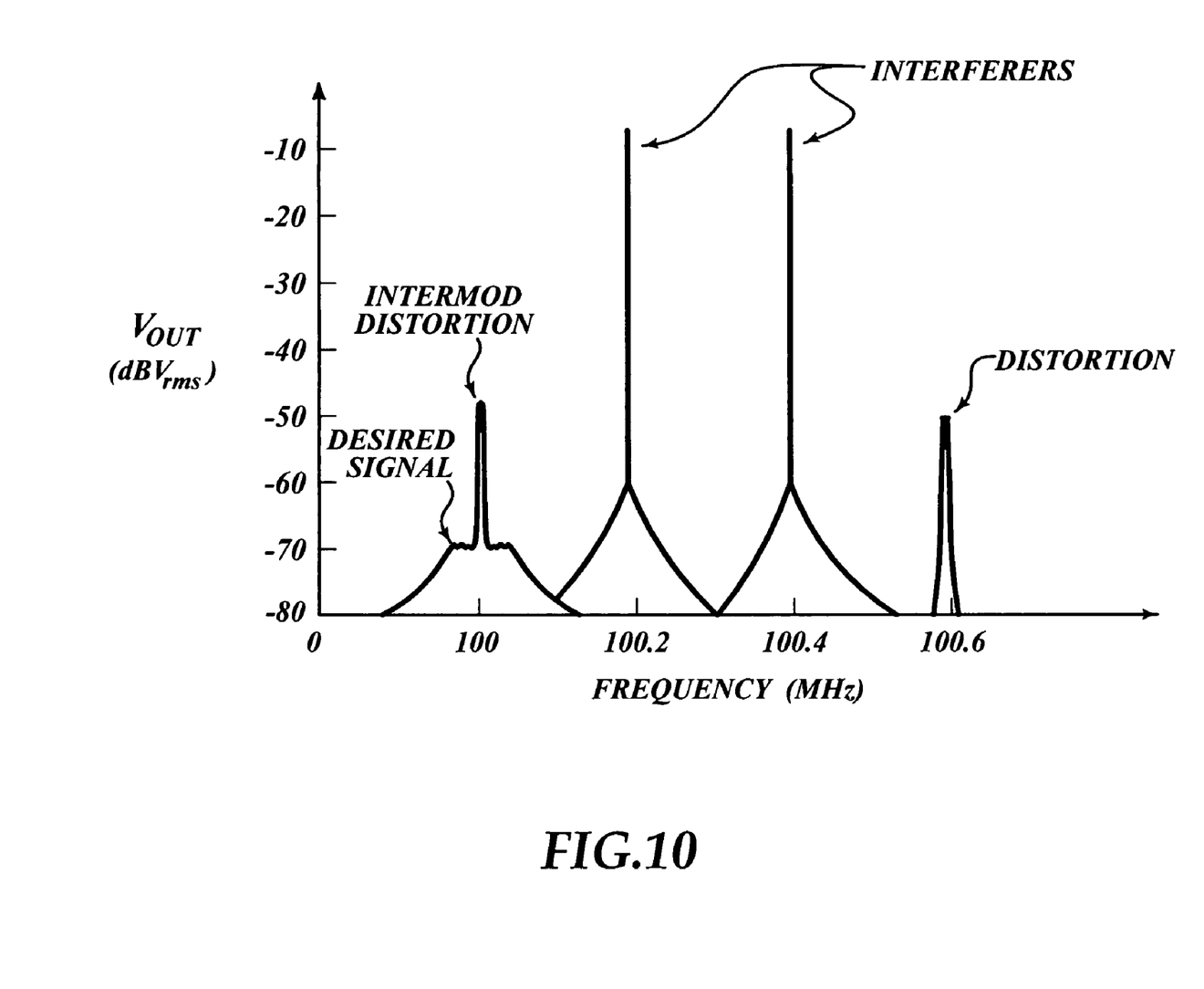
FIG. 10 is an example graph illustrating inter-modulation distortion from an example receiver arranged in accordance with at least one feature of the present disclosure.

The effect of inter-modulation distortion on in-band signals is depicted in FIG. 10. The pictured signals are taken from the output of an example LNA. Although not necessarily drawn to scale, FIG. 10 illustrates how the inter-modulation distortion can affect receiver performance. The desired signal is centered at 100 MHz. One interfering signal is present at 100.2 MHz, while a second interfering signal is present at 100.4 MHz. These interfering signals may be present in the environment and used by other systems. Various non-linear effects in the LNA results in distortion signals. One of the distortion signals overlay the desired signal and is a potential source of problems in the receiver, since it corresponds to inter-modulation distortion.

Inter-modulation distortion is the result of the interference signals at the input of the amplifier (e.g., an undesired signal at 100.2 MHz and 10.4 MHz) that causes a spurious (undesired) signal at the desired signal frequency (e.g., 100 MHz). This spurious distortion component can interfere with reception of the desired signal at 100 MHz for low input signal levels.

In one example, the ratio of the spurious signal level to the interference level is −65 dBc when the biasing current in one half of the LNA is on the order of 10 mA. An inter-modulation distortion level of −65 dBc allows good receiver sensitivity for fairly strong inference. In another example, the DC bias level for the LNA is reduced from 10 mA to 4 mA (for one half of the LNA), and the spurious signal at 100 MHz is now on the order of only −45 dBc. An inter-modulation distortion level of −45 dBc exhibits a poor communication link quality such that the biasing current should be increased to reduce interference. For this example, the biasing is adjusted (e.g., using a algorithmic control, either software or hardware based, of the voltage reference circuit) to increase the operating current in the LNA.

The software and/or hardware mechanisms are arranged to monitor communication link quality over a time period longer than the fading rate. The fading rate depends on how fast the receiver in the mobile electronic device is moving through a signal region and the various environmental factors that cause a fade in signal reception. Since operation may occur when devices are near a person moving on foot, the speed of a pedestrian can be used as a baseline to set the slowest fading rate. The pedestrian walking rate may thus be used to determine how fast to adjust the DC bias. Making slow changes to DC bias is needed because the communication link quality can be falsely acceptable due to one of the interference signals being in an RF fade for a short time, where a false indicator that it is OK to maintain a reduced bias is identified. When the user moves a significant distance relative to the radio broadcast towers then the DC bias should be adjusted to match the new environment. Also the interfering signal frequencies may be monitored by momentarily re-tuning the radio and measuring received signal strength as a confirmation of the presence of interfering signals.

Although the invention has been described herein by way of exemplary embodiments, variations in the structures and methods described herein may be made without departing from the spirit and scope of the present disclosure. For example, the positioning of the various components may be varied. Individual components and arrangements of components may be substituted as known to the art. Circuit functions can be combined and/or separated into additional parts as may be desired for certain implementations. Since many embodiments of the invention can be made without departing from the spirit and scope of the invention, the invention is not limited except as by the appended claims.

What is claimed is:

1. A method for dynamically adjusting a DC bias condition for a receiver system that is in communication with a broadcasting device via a communication link, the method comprising:

generating an amplified signal with a low noise amplifier block in the receiver system in response to a broadcast signal received via the communication link; wherein the low noise amplifier block consists of a first low noise amplifier circuit and a second low noise amplifier circuit that are arranged in parallel; wherein a first side of a tuned circuit is coupled to a first input (INP) of the first low noise amplifier circuits through a capacitor circuit CIP, a second side of the tuned circuit is coupled to a second input (INM) of the second low noise amplifier circuit through a capacitor circuit CIN, wherein the first low noise amplifier circuit is arranged to provide a first output signal (OUTP) in response to the first input signal (INP), while the second low noise amplifier circuit is arranged to provide a second output signal (OUTM) in response to a second input signal (INM), wherein the low noise amplifier block further comprises resistor circuits RI1 and RI2 that are coupled in series between INP and INM, where a common point is biased by a DC biasing signal (VDC), wherein resistor circuits RO1 and RO2 are series coupled between OUTP and OUTM, where the common point is arranged to provide a sense signal (VSNS1) that is related to a DC signal level of the output of the low noise amplifiers, wherein a capacitor circuit CC is coupled between the common points to provide compensation of the first low noise amplifier and the second low noise amplifier; wherein the VSNS1 is coupled to a differential amplifier as a VSNS2 signal via a follower circuit XF1 comprising an n-type transistor biased as a follower by a current source ISN, wherein an output of a reference generator circuit (VBIAS_CTL) is coupled to another input of the differential amplifier circuit; wherein the differential amplifier is arranged to provide a control signal in response to a comparison between the VSNS2 signal and the VBIASCTL signal such that a signal VDC is adjusted to a DC bias set point for the first low noise amplifier circuit and the second low noise amplifier circuit;

generating a baseband signal at an output of a receiver block in the receiver system in response to the amplified signal;

monitoring the baseband signal with a digital base-band block in the receiver system, wherein the digital baseband block is arranged to evaluate a link quality associated with the communication link;

identifying an unacceptable link quality associated with the communication link from the monitored link quality with the digital base-band block; and changing the DC bias condition for the low noise amplifier block when the monitored link quality is identified by the digital base-band block as unacceptable; wherein the DC bias condition for the low noise amplifier block is adjusted by feedback from the digital base-band block such that a relatively constant gain is achieved.

2. The method of claim 1, wherein monitoring comprises: evaluating the baseband signal from the output of the receiver block, and determining the link quality from at least one member of a group comprising: the baseband signal and a previously received baseband signal from the output of the receiver block in the receiver system.

3. The method of claim 2, wherein determining the link quality comprises calculating, with the digital base-band block, at least one member of a group comprising: a noise characteristic, a distortion characteristic, an interference characteristic, an inter-modulation distortion characteristic, a total harmonic distortion characteristic, a signal fad characteristic e, a signal-to-noise characteristic, a spurious noise characteristic, a white noise characteristic, a thermal noise characteristic, a colored noise characteristic, and a power consumption characteristic.

4. The method of claim 1, wherein monitoring the baseband signal with the digital base-band block comprises at least one member of a group comprising: periodically evaluating a received signal characteristic from the receiver block, continuously evaluating a received signal characteristic from the receiver block, evaluating the received signal characteristic in response to a predetermined triggered event, and evaluating the received signal characteristic in response to a user initiated trigger event.

5. The method of claim 1, wherein identifying the unacceptable link quality comprises determining the occurrence of an unacceptable receiver condition corresponding to at least one member of a group comprising: an excessive power consumption level, an excessive level of inter-modulation distortion, an excessive level of noise, a high received signal quality with a high power consumption level, a low received signal quality with a low power consumption level, and a high signal interference level.

6. The method of claim 1, wherein changing the DC bias condition comprises: identifying an appropriate biasing level for the low noise amplifier block based on empirical data associated with the monitored link quality, selecting a reference signal for the appropriate biasing level, and adjusting the DC biasing condition for the low noise amplifier block based on the selected reference signal.

7. The method of claim 6, wherein adjusting the DC biasing condition comprises: comparing an output DC condition associated with an output of the low-noise amplifier block in the receiver system to the selected reference signal, and controlling an input DC level associated with an input of the low noise amplifier block until the selected reference signal is substantially matched to the output DC condition.

8. The method of claim 1, wherein changing the DC bias condition comprises at least one member of a group comprising adjusting a DC bias voltage and adjusting a DC bias current.

9. An apparatus for dynamically adjusting a DC bias condition for a receiver system that is in communication with a broadcasting device via a communication link, the apparatus comprising:

a low noise amplifier circuit that is configured to provide an output signal in response to an input signal that is received via the communication link, wherein the low noise amplifier has a power consumption that is determined by a biasing condition; wherein the low noise amplifier comprises a first amplifier and a second amplifier arranged in parallel, wherein a first side of a tuned circuit is coupled to a first input (INP) of the first amplifier circuit through a capacitor circuit CIP, a second side of the tuned circuit is coupled to a second input (INM) of the second amplifier circuit through a capacitor circuit CIN, wherein the first amplifier circuit is arranged to provide a first output signal (OUTP) in response to the first input signal (INP), while the second amplifier circuit is arranged to provide a second output signal (OUTM) in response to a second input signal (INM), wherein the low noise amplifier circuit further comprises resistor circuits RI1 and RI2 that are coupled in series between the INP and the INM, where a common point is biased by a DC biasing signal (VDC), wherein resistor circuits RO1 and RO2 are series coupled between the OUTP and the OUTM, where the common point is arranged to provide a sense signal (VSNS1) that is related to a DC signal level of the output of the low noise amplifiers, wherein a capacitor circuit CC is coupled between the common points to provide compensation of the first low noise amplifier and the second low noise amplifier; wherein the VSNS1 is coupled to a differential amplifier, wherein an output of a reference generator circuit (VBIAS_CTL) is coupled to another input of the differential amplifier circuit; wherein the differential amplifier is arranged to provide a control signal in response to a comparison between the VSNS2 signal and the VBIASCTL signal such that a signal VDC is adjusted to a DC bias set point for the first low noise amplifier circuit and the second low noise amplifier circuit; and a digital base-band processing means that is arranged to vary the analog reference signal via the adjustment signal based on an identified link quality for the receiver system.

10. The apparatus of claim 9, the reference generator circuit comprising at least one member of a group comprising: a voltage divider circuit, a series voltage divider circuit, a parallel voltage divider circuit, a combined series-parallel voltage divider circuit, a binary scaled voltage divider circuit, a logarithmically scaled voltage divider circuit, a linearly scaled voltage divider circuit, a non-linearly scaled voltage divider circuit, a resistive voltage divider circuit, a capacitive voltage divider circuit, a transistor based voltage divider circuit, and a switch selectable voltage divider ratio.

11. The apparatus of claim 9, further comprising: a decoder that is arranged to vary the adjustment signal, wherein the decoder corresponds to at least one member of a group comprising: a decoder circuit and a decoder process that is coordinated by the processing means.

12. The apparatus of claim 9, wherein the digital base-band processing means comprises at least one member of a group comprising: a micro-processor, a micro-controller, a digital signal processor, a portion of the receiver system, a digital base-band processor, a radio receiver sub-system, and an application specific integrated circuit that is configured to provide processing.

13. The apparatus of claim 9, wherein the biasing conditions of the first amplifier and the second amplifier are varied in response to the resistor divider circuit.

14. The apparatus of claim 9, wherein the identified link quality for the receiver system is determined from at least one member of a group comprising: a noise characteristic, a distortion characteristic, an interference characteristic, an inter-modulation distortion characteristic, a total harmonic distortion characteristic, a signal fad characteristic e, a signal-to-noise characteristic, a spurious noise characteristic, a white noise characteristic, a thermal noise characteristic, a colored noise characteristic, and a power consumption characteristic.

15. The apparatus of claim 9, wherein the digital base-band processing means is further arranged to monitor the link quality for the receiver continuously over a time interval.

16. The apparatus of claim 9, wherein the digital base-band processing means is further arranged to monitor the link quality for the receiver periodically over a time interval.

17. The apparatus of claim 9, wherein the digital base-band processing means is further arranged to monitor the link quality for the receiver system as demanded by: a predetermined trigger event, a user initiated trigger event, an evaluated signal characteristic, and a scheduled event.

18. An apparatus for adjusting a DC bias condition for a receiver system that is in communication with a broadcasting device via a communication link, the method comprising:
   a low noise amplifier block in the receiver system that is arranged to general an amplified signal in response to a broadcast signal received via the communication link; wherein the low noise amplifier block consists of a first low noise amplifier circuit and a second low noise amplifier circuit that are arranged in parallel; wherein a first side of a tuned circuit is coupled to a first input (INP) of the first low noise amplifier circuits through a capacitor circuit CIP, a second side of the tuned circuit is coupled to a second input (INM) of the second low noise amplifier circuit through a capacitor circuit CIN, wherein the first low noise amplifier circuit is arranged to provide a first output signal (OUTP) in response to the first input signal (INP), while the second low noise amplifier circuit is arranged to provide a second output signal (OUTM) in response to a second input signal (INM), wherein the low noise amplifier block further comprises resistor circuits RI1 and RI2 that are coupled in series between INP and INM, where a common point is biased by a DC biasing signal (VDC), wherein resistor circuits RO1 and RO2 are series coupled between OUTP and OUTM, where the common point is arranged to provide a sense signal (VSNS1) that is related to a DC signal level of the output of the low noise amplifiers, wherein a capacitor circuit CC is coupled between the common points to provide compensation of the first low noise amplifier and the second low noise amplifier; wherein the VSNS1 is coupled to a differential amplifier as a VSNS2 signal via a follower circuit XF1 comprising an n-type transistor biased as a follower by a current source ISN, wherein an output of a reference generator circuit ($VBIAS_{13}$ CTL) is coupled to another input of the differential amplifier circuit; wherein the differential amplifier is arranged to provide a control signal in response to a comparison between the VSNS2 signal and the VBIASCTL signal such that a signal VDC is adjusted to a DC bias set point for the first low noise amplifier circuit and the second low noise amplifier circuit;
   a digital base-band processor means that is arranged to:
      monitor the base-band signal;
      evaluate a link quality associated with the communication link from the monitored base-band signal;
   identify an unacceptable link quality associated with the communication link; and
      change the DC bias condition for the low noise amplifier block when the link quality is identified as unacceptable, wherein the DC bias condition for the low noise amplifier block is adjusted by feedback from the digital base-band block such that a relatively constant gain is achieved.

* * * * *